US 8,111,959 B2

(12) United States Patent (10) Patent No.: US 8,111,959 B2
Shapiro (45) Date of Patent: Feb. 7, 2012

(54) METHOD AND SYSTEM FOR COUPLING MULTIMODE OPTICAL FIBER TO AN OPTICAL DETECTOR

(75) Inventor: Carmi Shapiro, Moshav Matityahu (IL)

(73) Assignee: Corning MobileAccess Ltd, Airport City (IL)

( * ) Notice: Subject to any disclaimer, the term of this patent is extended or adjusted under 35 U.S.C. 154(b) by 251 days.

(21) Appl. No.: 12/511,199

(22) Filed: Jul. 29, 2009

(65) Prior Publication Data
US 2010/0027940 A1 Feb. 4, 2010

Related U.S. Application Data

(60) Provisional application No. 61/084,659, filed on Jul. 30, 2008.

(51) Int. Cl.
*G02B 6/42* (2006.01)
*H05K 13/00* (2006.01)
(52) U.S. Cl. ............... 385/52; 385/32; 385/31; 385/88; 385/92; 29/592.1
(58) Field of Classification Search ................. 385/52, 385/88, 89, 92, 94, 14, 31, 32; 29/592.1
See application file for complete search history.

(56) References Cited

U.S. PATENT DOCUMENTS

| | | | |
|---|---|---|---|
| 5,029,965 A * | 7/1991 | Tan | 385/90 |
| 5,339,184 A | 8/1994 | Tang | |
| 5,436,444 A | 7/1995 | Rawson | 250/227.14 |
| 5,450,508 A * | 9/1995 | Decusatis et al. | 385/25 |
| 5,502,446 A | 3/1996 | Denninger | |
| 5,809,395 A | 9/1998 | Hamilton-Piercy et al. | |

(Continued)

FOREIGN PATENT DOCUMENTS

EP 0355328 A2 2/1990
(Continued)

OTHER PUBLICATIONS

International Search Report for PCT/US2010/058055 mailed Feb. 10, 2011, 3 pages.

*Primary Examiner* — Brian Healy
(74) *Attorney, Agent, or Firm* — C. Keith Montgomery

(57) ABSTRACT

A method for making a multimode fiber optic subassembly includes alignment of an optical detector with a fiber termination of an optical fiber. The output of the optical detector (e.g. photocurrent) can be measured from light being transmitted through the optical fiber and detected by the optical detector. The end of the optical fiber and/or the optical detector can be positioned and angularly oriented in order to obtain relative maximum or peak output of the optical detector for a given position and orientation. The output of the optical detector can be monitored while mechanically manipulating, e.g. bending, flexing, shaking and/or twisting, the optical fiber, in order to verify that the positional relationship between the end of the optical fiber and the optical detector corresponds to a position and/or orientation that provides stable output from the optical detector. If the optical detector output is not stable, the end of the multimode optical fiber and the optical detector can be moved, changing the position and/or the orientation of one or both, until the output of the optical detector is stable during manipulation. If the optical detector output is stable, the end of the multimode optical fiber is fixed to the optical detector. The resulting subassembly, a fiber optic pigtail, can be made by cutting the optical fiber a short distance from the optical detector.

16 Claims, 5 Drawing Sheets

U.S. PATENT DOCUMENTS

| | | | |
|---|---|---|---|
| 6,049,705 A | 4/2000 | Xue | |
| 6,198,432 B1 | 3/2001 | Janky | |
| 6,205,266 B1* | 3/2001 | Palen et al. | 385/15 |
| 6,480,651 B1* | 11/2002 | Rabinski | 385/52 |
| 6,577,420 B1 | 6/2003 | Ford et al. | 359/152 |
| 6,676,305 B2* | 1/2004 | Dallas et al. | 385/91 |
| 6,895,249 B2 | 5/2005 | Gaal | |
| 6,914,539 B2 | 7/2005 | Hoctor et al. | |
| 6,918,269 B2* | 7/2005 | Wang | 65/407 |
| 7,023,382 B1 | 4/2006 | Akano | |
| 7,123,939 B1 | 10/2006 | Bird et al. | |
| 7,443,505 B2* | 10/2008 | Lee et al. | 356/399 |
| 2003/0142926 A1* | 7/2003 | Dallas et al. | 385/91 |
| 2003/0156787 A1* | 8/2003 | King et al. | 385/31 |
| 2004/0100930 A1 | 5/2004 | Shapira et al. | |
| 2004/0102196 A1 | 5/2004 | Weckstrom et al. | |
| 2005/0053008 A1 | 3/2005 | Griesing et al. | 370/241 |
| 2005/0180700 A1 | 8/2005 | Farr | 385/89 |
| 2006/0056283 A1 | 3/2006 | Anikhindi et al. | |
| 2006/0128425 A1 | 6/2006 | Rooyen | |
| 2006/0262014 A1 | 11/2006 | Shemesh et al. | |
| 2006/0276227 A1 | 12/2006 | Dravida | |
| 2007/0264009 A1 | 11/2007 | Sabat, Jr. et al. | |
| 2008/0146146 A1 | 6/2008 | Binder et al. | 455/20 |
| 2008/0244148 A1 | 10/2008 | Nix, Jr. et al. | 710/313 |
| 2008/0298481 A1 | 12/2008 | Rofougaran et al. | 375/260 |
| 2010/0027940 A1* | 2/2010 | Shapiro | 385/52 |

FOREIGN PATENT DOCUMENTS

| | | |
|---|---|---|
| EP | 0709974 A1 | 5/1996 |
| EP | 0938204 A1 | 8/1999 |
| EP | 1085684 A2 | 3/2001 |
| GB | 2313020 A | 11/1997 |
| JP | 05252559 A | 9/1993 |
| JP | 05327569 A | 12/1993 |
| JP | 05327576 A | 12/1993 |
| JP | 8122587 A | 5/1996 |
| WO | WO-9613102 A1 | 5/1996 |
| WO | WO-9804054 A1 | 1/1998 |
| WO | WO-02091618 A1 | 11/2002 |
| WO | WO-2004107783 A1 | 12/2004 |
| WO | WO-2006105185 A2 | 10/2006 |
| WO | WO-2006136811 A1 | 12/2006 |
| WO | WO-2007133630 A2 | 11/2007 |

* cited by examiner

METHOD AND SYSTEM FOR COUPLING MULTIMODE OPTICAL FIBER TO AN OPTICAL DETECTOR

CROSS-REFERENCE TO RELATED APPLICATIONS

This application claims any and all benefits as provided by law of U.S. Provisional Application No. 61/084,659 filed 30 Jul. 2008, which is hereby incorporated by reference in its entirety.

STATEMENT REGARDING FEDERALLY SPONSORED RESEARCH

Not Applicable

REFERENCE TO MICROFICHE APPENDIX

Not Applicable

BACKGROUND

1. Technical Field of the Invention

The present invention relates to a method and system for coupling multimode optical fibers to optical detectors. The present invention also relates to fiber optic pigtails made in accordance with the inventive method.

2. Description of the Prior Art

Fiber optic communication devices include a transmitter that comprises an optical energy source such as a laser diode coupled to one end of an optical fiber and a receiver that comprises an optical sensor or detector coupled to the other end of the optical fiber. The transmitter emits signal that are carried over the optical fiber and received by the receiver that can be great distances away. The transmitter can include a laser subassembly, also known as a pigtailed laser, that includes a short length of optical fiber fixed by welding or adhesive to a laser diode. The end of the optical fiber opposite the laser diode is typically connectorized with a fiber optic connector that is mated with a fiber optic adapter mounted at one end of a fiber optic cable assembly. Similarly, the receiver can include a photodiode subassembly, also known as a pigtailed photodiode, that includes a short length of optical fiber fixed by welding or adhesive to an optical detector, such as a photodiode. The end of the optical fiber opposite the photodiode is typically connectorized with a fiber optic connector that is mated with a fiber optic adapter mounted at other end of the fiber optic cable assembly.

There are several types of optical fibers, including single mode optical fiber and multimode optical fiber. As a result, there are single mode optical fiber pigtails and multimode optical fiber pigtails. In addition, multimode based systems are typically used for short distance applications using larger core diameter optical fiber. Single mode based systems are typically used for longer distance application using smaller core diameter optical fiber.

SUMMARY

It can be desirable to use a single mode fiber transmitter in a system that includes multimode fiber and equipment that uses multimode fiber pigtailed receivers. For example, a facility can be wired with multimode optical fiber and have equipment that includes multimode receivers that need to communicate with transmitters that are pigtailed with single mode optical fiber. It has been discovered that while the single mode pigtail connected to the transmitter laser diode can be connected to the multimode optical fiber that is connected to the photodiode optical detector of the receiver, the multimode pigtail that is fixed to optical detector using conventional manufacturing methods may not be sufficiently aligned such that the signals received from the optical detector are not stable and are sensitive to movements of the multimode optical fiber. Even when the multimode optical fiber is not disturbed physically, the distribution of light transmitted through a length of multimode fiber can continue to change over time.

According to the present invention, a method and system is provided for alignment of an optical detector and/or a multimode optical fiber termination in order to fix the multimode optical fiber termination to the optical detector. The alignment can include the adjustment of linear position and the angular orientation of both the multimode optical fiber and the optical detector using one or more mechanical positioning devices coupled to the end of the multimode optical fiber and one or more mechanical positioning devices coupled to the optical detector. While aligning the multimode fiber termination relative to the optical detector, a light source having a single mode fiber pigtail is illuminated causing light signals to be transmitted through the multimode optical fiber and detected by the optical detector. Signal output by the optical detector can be measured and the position and/or the angular orientation of the optical fiber and the optical detector can be adjusted to obtain the maximum signal output from the optical detector. With the alignment of the optical fiber and the optical detector held in position to provide maximum signal output, optical fiber can be manipulated by mechanical means to verify that the signal output from the optical detector is stable within a predefined range of variation.

If the signal output from the optical detector does not remain stable during manipulation, the optical fiber and/or the optical detector can be further aligned into a positional relationship wherein the signal output from the optical detector remains stable during manipulation.

If the signal output from the optical detector remains relatively stable during manipulation, the optical fiber can be fixed using laser welding, adhesive or other mechanical means, to the optical detector. In order create a fiber optic pigtail, the fiber optic cable can be cut or cleaved at a predefined distance from the optical detector. A fiber optic connector can be mounted on the cut or cleaved end of the fiber optic pigtail. Alternatively, the fiber optic connector can be mounted on one end of the fiber optic pigtail prior to alignment and fixation to the optical detector.

According to an aspect of the present invention, there is provided an optical detector subassembly having a multimode optical fiber pigtail aligned according to a method as disclosed herein According to another aspect of the present invention, there is provided an optical detector subassembly having a multimode optical fiber pigtail aligned according to a method as disclosed herein that provides stable output while the optical fiber is manipulated.

According to another aspect of the present invention, there is provided an optical detector subassembly having a multimode optical fiber pigtail aligned according to the invention that provides reduced signal output variation while the optical fiber is manipulated when compared with multimode optical fiber pigtails produced according to prior art methods.

According to a further aspect of the present invention, is to provide a method for manufacturing an optical detector subassembly having a multimode optical fiber pigtail aligned to an optical detector that more consistently produces optical detector subassemblies that provide stable output while the optical fiber is manipulated.

These and other capabilities of the invention, along with the invention itself, will be more fully understood after a review of the following figures, detailed description, and claims.

DETAILED DESCRIPTION OF PREFERRED EMBODIMENTS

Figure 1:
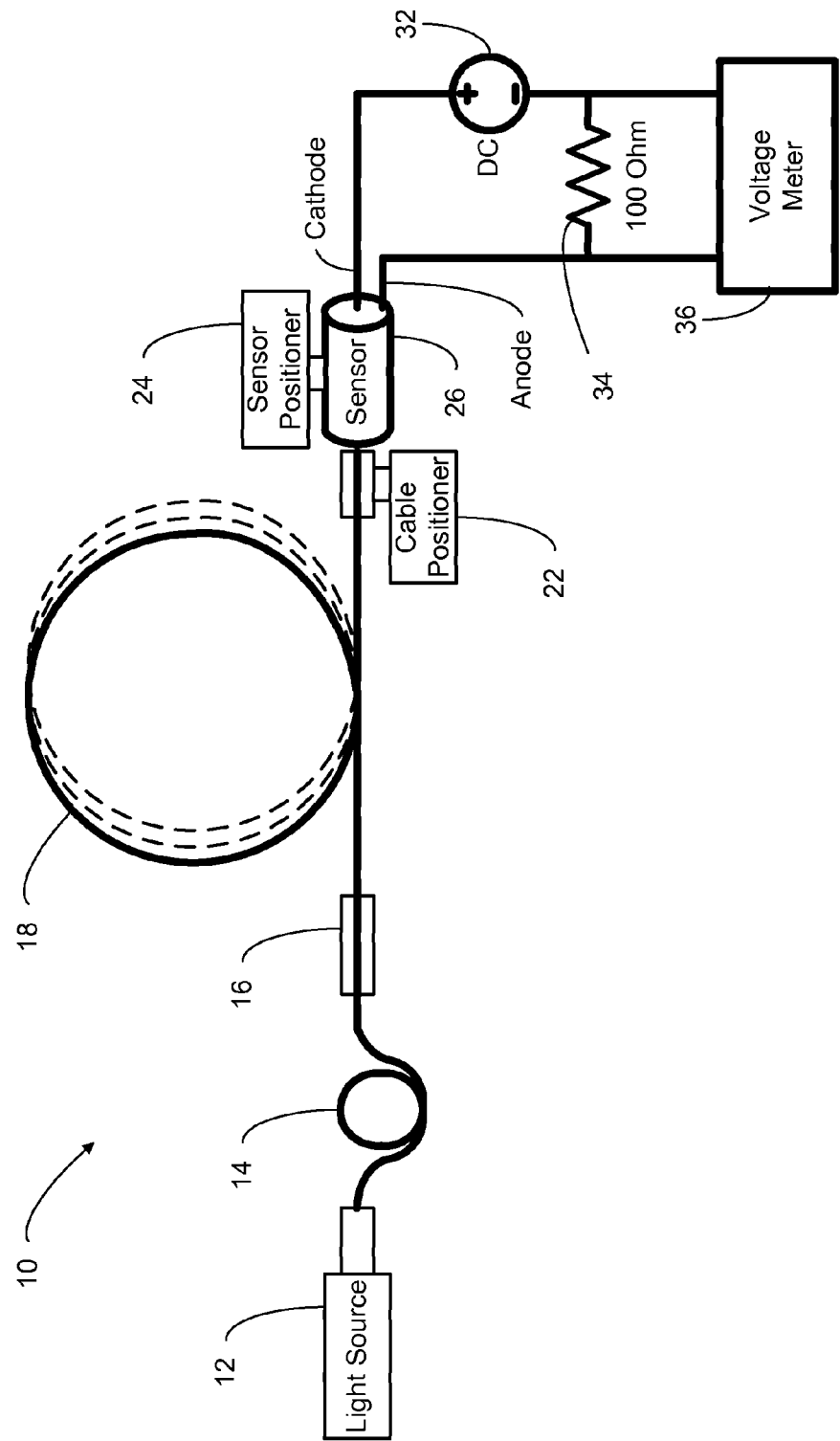
FIG. 1 is a diagrammatic view of a system for coupling multimode fiber to an optical detector according to an embodiment of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

Figure 2:
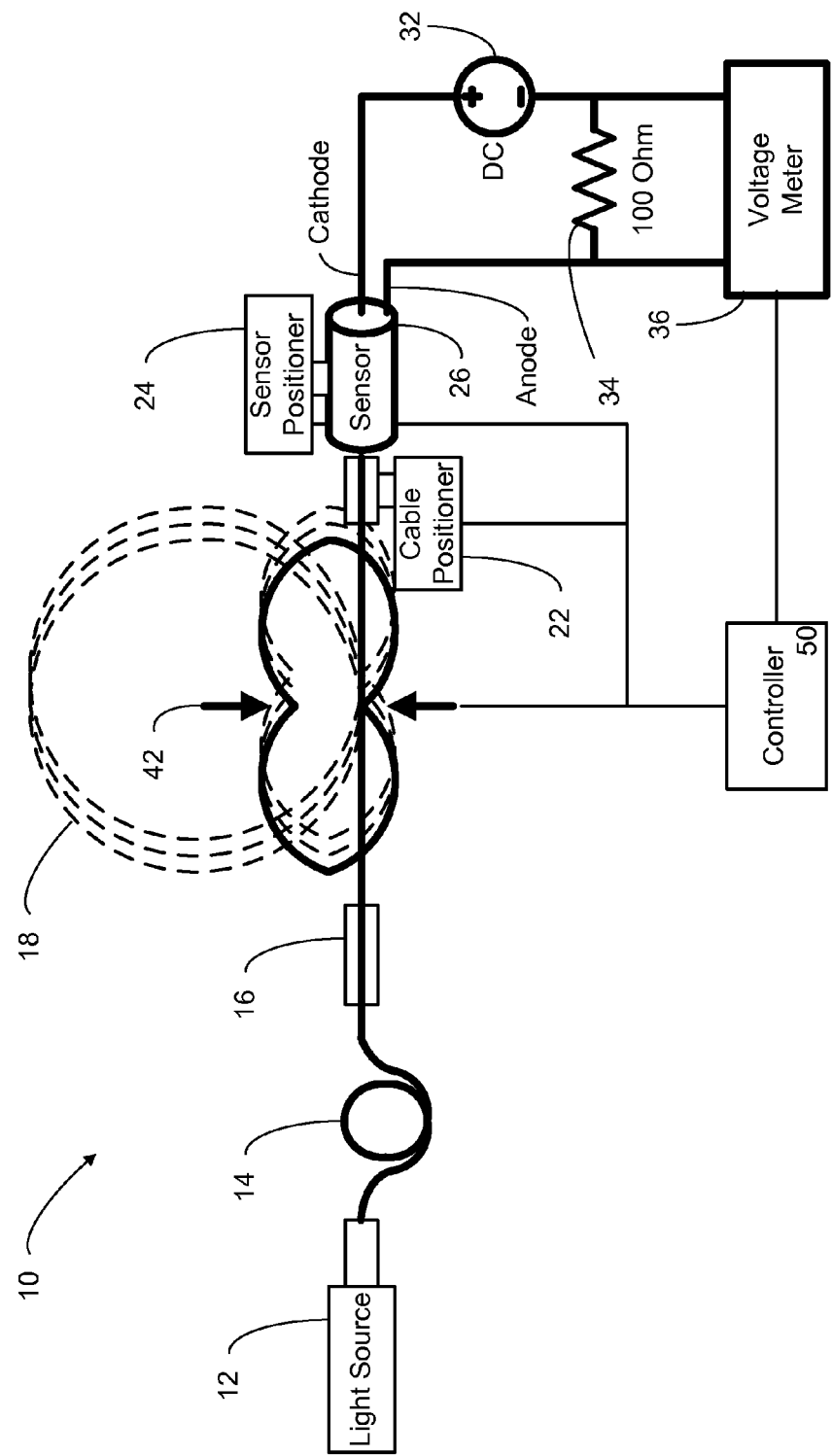
FIG. 2 is a diagrammatic view of a system for coupling multimode fiber to an optical detector according to an embodiment of the present invention.

Referring now to the drawings, FIGS. 1 and 2 show a simplified diagram of a photodiode coupling system 10, according to an embodiment of the present invention. System 10 includes a light source 12 (for example, a Fabry-Perot laser diode) coupled, at its output, to an optical fiber pigtail 14. Optical fiber pigtail 14 is preferably a single mode optical fiber designed to carry the wavelength of light energy produced by light source 12. Optical fiber pigtail 14 can be coupled by a mating sleeve 16 to a multimode optical fiber 18. Optical fiber 18 can be wound into a coil of one or more loops of less than ten inches in diameter. The fiber terminations of optical fiber pigtail 14 and multimode optical fiber 18 can be angle cleaved and/or polished to provide lower back-reflection toward laser source 12. Alternatively, optical fiber pigtail 14 can be spliced to multimode optical fiber 18. The distal end of multimode optical fiber 18 can be ferrule terminated and positioned relative to the sensor 26 by cable positioner 22. The ferrule or end of the optical fiber 18 can be removably coupled, for example by a clamp, to the cable positioner 22, allowing the ferrule or the distal end of optical fiber 18 to be fixed by laser welding, adhesive or other methods to the sensor 26.

The sensor 26 can be any optical detector that can be used to detect the optical signals sent over the multimode optical fiber 18. In accordance with one embodiment of the invention, the sensor 26 can be a photodiode. The sensor 26 can be mounted in a housing and optionally positioned relative to the distal end of the optical fiber 18 by a sensor positioner 24.

In accordance with one embodiment of the invention, the cable positioner 22 can be a linear positioner which can move the ferrule or the distal end of the optical fiber 18 along one or more Cartesian axes (X, Y, Z), for example, in two dimensions over the face of the sensor 26. In accordance with an alternative embodiment of the invention, the cable positioner 22 can be an angular positioner which can move the ferrule or the distal end of the optical fiber 18 over one or more angles (theta, phi). In accordance with one embodiment of the invention, the sensor positioner 24 can be a linear positioner which can move the sensor 26 along one or more Cartesian axes (X, Y, Z), for example, in two dimensions to align the face of the sensor 26 with the ferrule or the distal end of the optical fiber 18. In accordance with an alternative embodiment of the invention, the sensor positioner 24 can be an angular positioner which can move the sensor 26 over one or more angles (theta, phi). Further, the cable positioner 22 can be a linear positioner and sensor positioner 24 can be an angular positioner or the cable positioner 22 can be an angular positioner and sensor positioner 24 can be a linear positioner. In alternative embodiments, one of the ferrule or distal end of optical fiber 18 and sensor 26 can be fixed in position and a single positioner (either a cable positioner 22 or a sensor positioner 24) can be used to align the sensor 26 or the ferrule or distal end of optical fiber 18, respectively. The single positioner can move along one or more Cartesian axes (X, Y, Z), for example, in two dimensions to align the face of the sensor 26 with the ferrule or the distal end of the optical fiber 18. In an alternate embodiment, the ferrule or the distal end of the optical fiber 18 and/or the sensor 26 can be moved in a circular or spiral pattern to align the face of the sensor 26 with the ferrule or the distal end of the optical fiber 18.

In the embodiment where the sensor 26 includes a photodiode, the photodiode can be reverse biased by connecting it to a direct current power source 32. One of the measured output signals from the photodiode sensor 26 can include the photocurrent generated by the absorption of light emitted from laser diode 12 and transmitted through optical fibers 14 and optical fiber 18. The photocurrent can be measured, for example, using a (digital) voltage meter 36 to measure the voltage drop across a resistor 34 (100 Ohm) connected in series with photodiode sensor 26 and DC power source 32. The photocurrent can be determined using Ohm's law from the measured voltage drop over series resistor 34.

In an alternative embodiment of the invention, light source 12 can be controlled to inject a square wave signal at a low frequency into the laser light source 12 and monitor the output of the sensor 26 on an oscilloscope. The alignment operation can be performed and positioning of the ferrule or the distal end of optical fiber 18 and the sensor 26 can be performed so that the square wave output signal appears well squared off and at maximum amplitude irrespective of the movements of the multimode optical fiber 18.

In an alternative embodiment of the invention, light source 12 can be controlled to inject a continuous wave (CW) radio frequency signal into the laser light source 12 and monitor the change in the amplitude of the RF signal as a function of time. The alignment operation can be performed and positioning of the ferrule or the distal end of optical fiber 18 and the sensor 26 can be performed so that the amplitude of the RF signal is insensitive to movements of the multimode optical fiber 18.

Figure 4A:
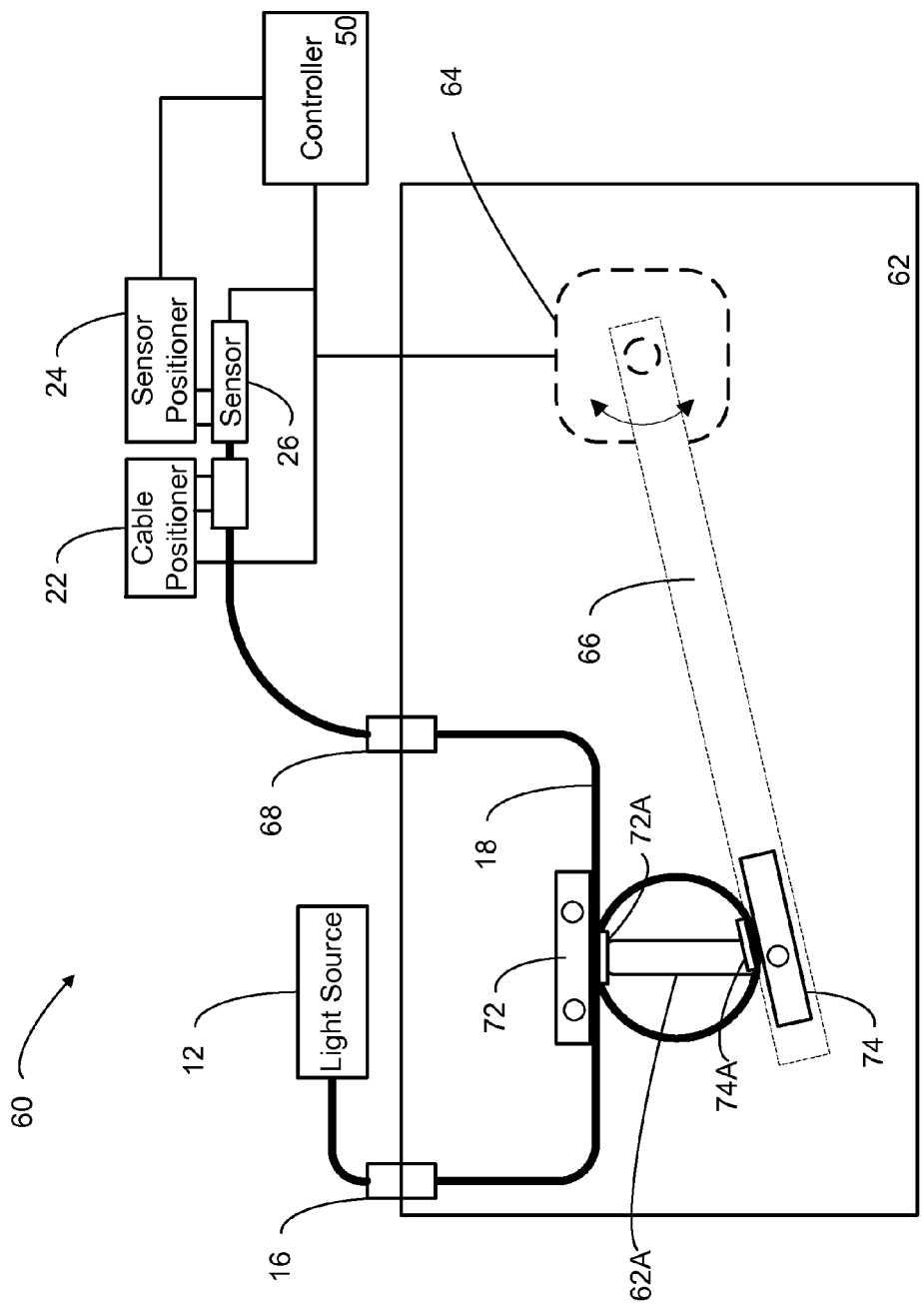
FIGS. 4A and 4B show a diagram of an apparatus for manipulating multimode optical fiber according to an embodiment of the present invention.
Figure 4B:
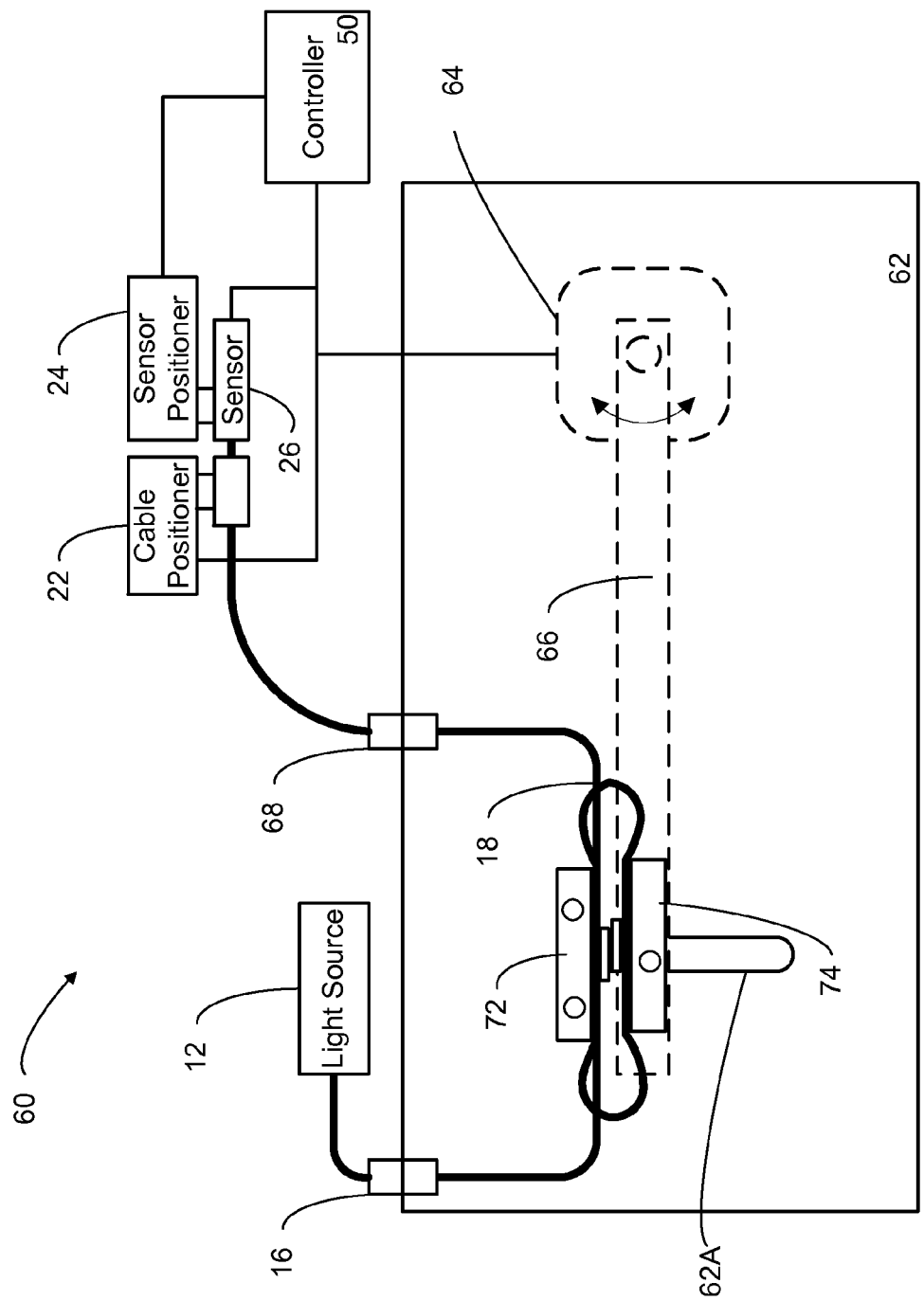

In accordance with one embodiment of the invention, a computer controlled device can be used to measure the sensor output signal and adjust the (linear and/or angular) positions of the multimode optical fiber 18 and/or the sensor 26 in accordance with the invention. As shown in FIGS. 2, 4A and 4B, the system according to the invention can include a computerized controller 50, connected to the output of the sensor 26 (for example, using a power source 32, resistor 34 and voltage measuring device 36) and connected to the cable positioner 22 and the sensor positioner 24 to control the alignment of the optical fiber 18 and/or sensor 26 in accordance with the invention. The controller 50 can employ one or more computer programs, software and/or firmware in operation to perform one or more algorithms in accordance with the invention. The cable positioner 22 and the sensor positioner 24 can each include one or more motorized linear or angular positioning stages or a robotic manipulator that can be controlled directly or indirectly by controller 50. The controller 50 can also be connected to a manipulating or clamping mechanism 42 which can hold or support one or more loops of the optical fiber 18 and manipulate the optical fiber 18 in accordance with the invention while the measuring the output signal from the sensor 26 to determine whether the output signal is substantially stable to allow the optical fiber 18 to be fixed to the sensor 26. In accordance with further embodiments of the invention, the controller 50 can be connected to an adhesive application system which can apply adhesive to the end of the optical fiber 18 to fix it to the sensor 26 in response to control signals from the controller 50. Alternatively, the controller 50 can be connected to a laser welding device that laser welds the end of the optical fiber 18 to the sensor 26. In one embodiment of the invention, the multimode optical fiber 18 can be cut or cleaved a short distance from the sensor 26 and a fiber optic connector can be mounted on the cut end of the pigtail. In an alternate embodiment of the invention, a fiber optic connector can be mounted on one end of the multimode optical fiber prior to alignment and fixation to the sensor 26.

Figure 3:
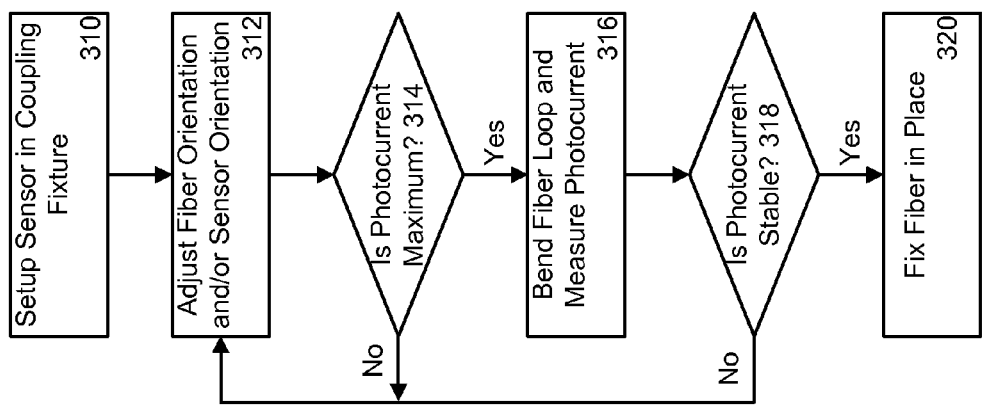
FIG. 3 is a flow diagram of a method for coupling multimode fiber to an optical detector, according to an embodiment of the present invention.

FIG. 3 shows a flow diagram illustrating a method for coupling multimode optical fiber to an optical detector according to an embodiment of the present invention. At 310, the coupling system 10 is setup whereby optical fiber 18 can be connected to the light source 12 by single mode fiber optic pigtail 14 and the mating sleeve 16, and the end of the optical fiber 18 (to be fixed to the sensor 26) can be coupled to the cable positioner 22 by a clamp or other mechanical coupling. Similarly, the sensor 26 can be coupled to the sensor positioner 24 by a clamp or other mechanical coupling. At 312, the position and/or the orientation of the optical fiber 18 and/or the sensor 26 can be adjusted and at the same time, the output signal from the sensor 26 (for example, the photocurrent from a photodiode sensor) can be monitored to adjust the optical fiber 18 and/or the sensor 26 into a relative position whereby the output signal from the sensor 26 is at a relative maximum or peak level. This can be accomplished by moving, in a small or predetermined amount, in each degree of freedom of the cable positioner 22 and/or the sensor positioner 24 individually and determining the difference between the output signal before and after the movement. If the movement in a given direction results in an increase in the output signal from the sensor 26, movement continues in that direction until the output signal from the sensor 26 starts to decrease (has passed its peak) and then the last movement is reversed to return the output signal to its relative maximum or peak level. If the movement in that direction results in a decrease in the output signal from the sensor 26, movement continues in the opposite direction until the output signal from the sensor 26 starts to decrease (has passed its peak) and then the last movement is reversed to return the output signal to its relative maximum or peak level.

At 314, if the sensor 26 output is not at its relative maximum or peak level, the process returns to 312 and the position and/or the orientation of the optical fiber 18 and/or the sensor 26 can be further adjusted. If the sensor 26 output is at its relative maximum or peak level, the process proceeds to 316 where the optical fiber loop 18 is manipulated.

At 316, the optical fiber loop is manipulated and the output of the sensor 26 can be monitored to determine whether the output of the sensor 26 is stable. In accordance with one embodiment of the invention, the relative maximum or peak output level of the sensor 26 (before manipulation) can be compared to the output level of the sensor 26 after optical fiber is manipulated and a difference or deviation value determined. The output of the sensor 26 can be considered stable where the difference or deviation value is smaller than a predetermined threshold value. In accordance with one embodiment of the invention, the predetermined threshold value can be determined as a function of the relative maximum or peak output level of the sensor 26, for example 0-15%. At 318, if the sensor 26 output is not considered stable, the process returns to 312 where the position and/or the orientation of the optical fiber 18 and/or the sensor 26 can be further adjusted to a new relative maximum or peak level.

At 318, if the sensor 26 output is considered stable, the process proceeds to 320 where the end of the optical fiber 18 is fixed to the sensor 26. At 320, the end of the optical fiber 18 can be fixed to the sensor 26 using any well know mechanical connection including mechanical connecting devices, laser welding or adhesives (for example, epoxy, UV cure adhesives), as known in the art of making optical fiber pigtails. In accordance with one embodiment of the invention an adhesive is used adhere a ferrule to the end of the optical fiber and after the end of the optical fiber and the sensor 26 are positioned in accordance with the invention, an adhesive is used to adhere the ferrule to the sensor 26.

FIGS. 4A and 4B shows an apparatus 60 for manipulating the optical fiber 18 according to one embodiment of the invention. The apparatus 60 can include a baseplate 62, an actuator 64 mounted to the baseplate 62, an arm 66 coupled to the actuator 64 and a pair of chucks 72 and 74 adapted to hold and manipulate the optical fiber 18. The actuator 64 can be mounted or coupled to the plate 62 and in one embodiment, the actuator can be mounted by screws or adhesive, to the back side, for example, the opposite side that the stationary chuck 72 is mounted to. The actuator 64 can include a rotary actuator or a motor having an output shaft that can rotate about an axis. Arm 66 can be mounted to the output shaft of the actuator 64, whereby actuation of the actuator 64 causes arm 66 to rotate about the axis. The apparatus 60 can include a stationary chuck 72 and a movable chuck 74. The stationary chuck 72 can be fastened to the front side of the baseplate 62, for example, by screws (through holes shown), by welding, brazing or adhesive. The movable chuck 74 can be coupled to the arm 66, for example, by screws (through hole shown), by welding, brazing or adhesive. A slot 62A can be provided to allow the movable chuck 74 to be coupled to the arm 66 through the baseplate 62, where the actuator 64 is mounted to the back side of the baseplate 62. Each chuck can, for example, include a large plate coupled to a small plate or bracket, wherein the short plate is spaced from the large plate by a small gap. The size of the gap can be selected to enable one or more loops of the optical fiber 18 to be held by each chuck 72, 74 without damaging the optical fiber during insertion and manipulation.

One end of the optical fiber 18 can include a connector which can mate with another connector mounted on one end of the pigtailed laser which serves as the light source. The two male connectors can be mated in the optical fiber adapter 16. The other end of the optical fiber 18 can include a connector that can mate with a connector mounted on the end of the optical fiber opposite the end to be fixed to photodiode optical sensor 26. The two connectors can be mated in optical fiber adapter 68. The end to be fixed can be held by the cable positioner 22 in relation to the sensor 26. The sensor 26 can be held by the sensor positioner 24. The controller 50 can be connected to the output of the sensor 26 and connected to the cable positioner 22 and/or the sensor positioner 26 to move the end of the optical fiber and/or the sensor to align the end of the optical fiber relative to the sensor 26 to produce the best output signal. In addition, the controller 50 can be connected to the actuator 64 to move the movable chuck 74 which can cause the loop of optical fiber 18 to become flattened as shown in FIG. 4B.

In operation, with the chucks arranged as shown in FIG. 4A, the controller 50 can actuate the cable positioner 22 and/or the sensor positioner 24 to align the end of the optical fiber with the sensor to produce the maximum output signal. After the optical fiber is aligned with sensor, the actuator 64 can be actuated causing the arm 66 to pivot about the axis, moving the movable chuck 74 towards the stationary chuck 72 as shown in FIG. 4B. Further, the actuator 64 can be actuated causing the arm 66 to pivot in the opposite direction, moving the movable chuck 74 away from the stationary chuck 72 as shown in FIG. 4A. Thus, the movable chuck 74 can be moved toward and away from the stationary chuck 72 according to a predefined or random frequency for a predetermined time period. For example, the movable chuck 74 can be moved at a frequency of 1.0 cycle per 5 seconds for a time period of 30 seconds. Other frequencies can range from 0.10 Hz to 1.0 Hz and the time period can be as short as 10 seconds and longer than 1 aligned minute. At the same time, the controller 50 can receive the output signal from the sensor 26 and determine whether the optical fiber-sensor alignment meets the stability requirements.

In accordance with one embodiment of the invention, sensor output stability can be determined as a function of the maximum and minimum output of the sensor recorded by the controller 50. For example, the controller 50 can record the maximum output of sensor 26 and the minimum output of sensor 26 and determine the sensor output stability as $(\text{Output}_{max} - \text{Output}_{min})/\text{Output}_{max}$. In an alternate embodiment, the sensor output stability can be determined as a function of the static output of the sensor prior to manipulation of the optical fiber and the outputs measured by the controller. For example, the sensor output stability can be determined as $(\text{Output}_{max} - \text{Output}_{min})/\text{Output}_{static}$.

In accordance with one embodiment of the invention, each of the stationary chuck 72 and the movable chuck 74 can include a face that is approximately 30 mm wide and each can include a 10 mm wide bracket 72A and 74A which holds the optical fiber in position relative to the face. In this embodiment, the face of the movable chuck 74 is moved by the actuator 64 toward the face of the stationary chuck 72 causing the one or more loops of optical fiber 18 to become elongated as shown in FIG. 4B. The width of the face can range from 5 mm to 50 mm and any holding device or mechanism (for example, bracket, adhesive, cable tie, tape) can be used to hold the optical fiber 18 against the faces of the chucks 72 and 74.

As one of ordinary skill will appreciate, in accordance with the invention, the position and/or the orientation of the optical fiber 18 and/or the sensor 26 can be adjusted to arrive at a relative maximum or peak output level of the sensor 26, which may or may not correspond to the absolute maximum or peak level for a given optical fiber 18 and sensor 26. As a practical matter, there can be more than one alignment configuration of the optical fiber 18 and the sensor 26 that results in a relative maximum or peak output level of the sensor 26. However, it may or may not be the case that each such alignment configuration proves to be stable when the optical fiber is manipulated.

In accordance with the invention, the level of stability tested for the comparison threshold can be determined by the physical component properties (including the diameter, and material composition and construction) of the optical fiber, the requirements of the system in which it will be used and the desired performance characteristics of the final subassembly (the fiber optic pigtail). In accordance with one embodiment of the invention, the stability of the output of the sensor 26 during the optical fiber manipulation operation can be limited to between 0% and 25% and preferably, less than 1.0% of the relative maximum or peak output value. The required level of stability can depend on the intended application of the fiber optic photodiode subassembly.

In accordance with the present invention, the optical fiber 18 can be manipulated while one end is operatively coupled to a light source 12 and the other end is held in position to be fastened to an optical detector 26. The optical fiber 18 can be manipulated in many different ways depending on the desired performance characteristics of the resulting subassembly and the physical component properties (including the diameter, and material composition and construction) of the optical fiber. In accordance with one embodiment of the invention, the multimode optical fiber 18 can be coiled into one or more loops having a diameter of between one and 10 inches, as shown in FIGS. 1 and 2, and bent by applying pressure 42 along a diameter of the loop(s) causing the loop(s) into a "figure 8" configuration. In an alternative embodiment of the invention, the multimode optical fiber 18 can be coiled into one or more loops having a diameter of less than 2.0 cm, as shown in FIGS. 1 and 2, and bent by applying pressure 42 along a diameter of the loop(s) causing the loop(s) into a "figure 8" configuration. In other embodiments of the invention, the loop(s) can be elongated or oval and the diameter can be less than one inch or greater than 10 inches. The loop(s) can be oriented in a horizontal orientation, a vertical orientation or an angled orientation. In other embodiments of the invention, the loops can be twisted into a "figure 8" configuration. In further embodiments of the invention, the optical fiber can be folded onto itself as part of the manipulation operation. In still further embodiments of the invention, the optical fiber can formed into one or more loops and the diameter of the loop(s) can be changed as part of the manipulation operation. In other embodiments of the invention, the optical fiber 18 can be shaken using well known optical fiber shaking equipment.

As one of ordinary skill appreciate the method of the invention can be practiced manually, for example, where the end of the optical fiber 26 can be clamped to linear positioning stage (providing X, Y and Z motion) and the sensor 26 can be clamped to an angular positioning stage (providing rotation about two orthogonal axes). In this embodiment, the user can move the end of the optical fiber 18 and the sensor 26 close together and measure the output on the voltmeter 36. The voltmeter 36 can measure the voltage across a 100 ohm resister and the photocurrent can be easily determined by dividing the voltage meter reading by 100. The user can then move the end of the optical fiber along each axis of the linear positioning stage and the sensor about each axis of the angular positioning stage, to find the relative maximum or peak output level of the sensor 26 for each axis. After the position corresponding to the maximum or peak output level of the sensor 26 is determined, the user can manipulate the cable, for example by coiling it on one or more loops and pinching it in the middle (or using a fixture to do so) while monitoring the reading of the voltmeter 36 to determine if the maximum or peak output level of the sensor 26 deviates by more than a defined threshold. If it does, the end of the optical fiber 18 and the sensor 26 can be re-aligned and the manipulation operation repeated. Alternatively, the end of the optical fiber 18 and the sensor 26 can be re-aligned while the optical fiber is manipulated and the output of the sensor 26 is monitored to detect the sensor 26 output level deviation. If the position proves to be stable during manipulation, the user can fasten the end of the optical fiber 18 to the sensor 26 using an adhesive, for example, an epoxy resin or UV curing adhesive, by laser welding, or any other well know means for attaching an optical fiber to an optical detector.

The end products produced in accordance with the present invention can include an optical fiber subassembly that includes an optical fiber fastened to an optical detector. The optical fiber can be, for example, multimode optical fiber. In accordance with one embodiment of the invention, the subassembly can include a relatively short length of multimode optical fiber fastened to an optical detector, commonly know as a fiber optic pigtail. In other embodiments of the invention, the subassembly can include a relatively long length of multimode optical fiber fastened to an optical detector. As one of ordinary skill will appreciate, the present invention can be used to fasten an optical fiber to an optical detector or any fiber optic component that can be connected to an optical fiber or between two optical fibers (including, for example, a laser diode, a filter, an isolator, an attenuator, a switch, a reflector, a modulator, a polarizer, a circulator or a splitter). In the latter embodiment, instead of positioning the optical detector, the optical energy source is positioned with respect to the end of the optical fiber and the output of the sensor coupled to the other end of the optical fiber can be monitored to find a position corresponding to a maximum or peak output level and the cable can be manipulated while monitoring the sensor output to confirm stability.

The present invention is not limited in its application to the details of design and the arrangement of the components set forth in the description or illustrated in the drawings. The invention is capable of other embodiments or of being practiced or carried out in various ways. Also, the phraseology and terminology employed herein is for the purpose of description and should not be regarded as limiting.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

What is claimed is:

1. A method making a fiber optic subassembly including an optical fiber and an optical detector, the method comprising:
    coupling a light source to a first end of the optical fiber enabling light energy from the light source to be transmitted from the first end through the optical fiber to a second end of the optical fiber;
    positioning the second end of the optical fiber relative to the optical detector;
    measuring an output signal output by the optical detector;
    adjusting the position of the second end of the optical fiber relative to the optical detector to align the second end of the optical fiber with respect to the optical detector at a position that corresponds to a relative peak signal output of the optical detector;
    while holding the second end of the optical fiber in a constant position relative to the optical detector, manipulating a remote portion of the optical fiber and monitoring the output signal of the optical detector to confirm that the output signal of the optical detector is stable during manipulation; and
    fixing the second end of the optical fiber to the optical detector.

2. A method making a fiber optic subassembly according to claim 1 wherein the position of the second end of the optical fiber is adjusted along at least one of three linear axes.

3. A method making a fiber optic subassembly according to claim 1 wherein the position of the optical detector is adjusted angularly about at least one of two rotational axes.

4. A method making a fiber optic subassembly according to claim 1 wherein the output signal of the optical detector after adjusting the position is compared to the output signal of the optical detector before adjusting the position.

5. A method making a fiber optic subassembly according to claim 1 wherein the output signal of the optical detector is considered stable if the output signal during manipulation does not deviate from the output signal prior to manipulation by more than a predetermined amount.

6. A method making a fiber optic subassembly according to claim 1 wherein the output signal of the optical detector is considered stable if a maximum output signal measured during manipulation does not deviate from a minimum output signal by more than a predetermined amount.

7. A fiber optic assembly including an optical fiber and an optical detector, the fiber optic subassembly being made according to the method comprising:
    coupling a light source to a first end of the optical fiber enabling light energy to be transmitted from the first end through the optical fiber to a second end of the optical fiber;
    positioning the second end of the optical fiber relative to the optical detector;
    measuring an output signal output by the optical detector;
    adjusting the position of the second end of the optical fiber relative to the optical detector to align the second end of the optical fiber with respect to the optical detector at a position that corresponds to a relative peak signal output of the optical detector;
    while holding the second end of the optical fiber in a constant position relative to the optical detector, manipulating a remote portion of the optical fiber and monitoring the output signal of the optical detector to confirm that the output signal of the optical detector is stable during manipulation; and
    fixing the second end of the optical fiber to the optical detector.

8. A fiber optic subassembly made according to claim 7 wherein the position of the second end of the optical fiber is adjusted along at least one of three linear axes.

9. A fiber optic subassembly made according to claim 7 wherein the position of the optical detector is adjusted angularly about at least one of two rotational axes.

10. A fiber optic subassembly made according to claim 7 wherein the output signal of the optical detector after adjusting the position is compared to the output signal of the optical detector before adjusting the position.

11. A fiber optic subassembly made according to claim 7 wherein the output signal of the optical detector is considered stable if the output signal during manipulation does not deviate from the output signal prior to manipulation by a predetermined amount.

12. A fiber optic subassembly including a multimode optical fiber and an optical detector, the fiber optic subassembly being made according to the method comprising:
    coupling a light source having a single mode optical fiber pigtail to a first end of the multimode optical fiber enabling light energy from the light source to be transmitted from the first end through the multimode optical fiber to a second end of the multimode optical fiber;

positioning the second end of the multimode optical fiber relative to the optical detector;

measuring an output signal output by the optical detector;

adjusting the position in a linear dimension of the second end of the multimode optical fiber relative to the optical detector to align the second end of the multimode optical fiber with respect to the optical detector to a position that corresponds to a relative peak signal output of the optical detector;

adjusting the position in an angular dimension of the optical detector relative to the second end of the multimode optical fiber to align the optical detector with respect to the second end of the multimode optical fiber to a position that corresponds to a relative peak signal output of the optical detector;

manipulating of the multimode optical fiber by forming the optical fiber in at least one loop and compressing the loop;

monitoring the output signal of the optical detector to confirm that the output signal of the optical detector is stable during manipulation; and fixing the second end of the multimode optical fiber to the optical detector.

13. The method of claim 1, further comprising iteratively positioning, measuring, adjusting and manipulating until the output signal of the optical detector is stable during manipulation.

14. The fiber optic subassembly made according to claim 7, wherein the method further comprises iteratively positioning, measuring, adjusting and manipulating until the output signal of the optical detector is stable during manipulation.

15. A method making a fiber optic subassembly including an optical fiber and an optical detector, the method comprising:

coupling a light source to a first end of the optical fiber enabling light energy from the light source to be transmitted from the first end through the optical fiber to a second end of the optical fiber;

positioning the second end of the optical fiber relative to the optical detector;

measuring an output signal output by the optical detector;

adjusting the position of the second end of the optical fiber relative to the optical detector to align the second end of the optical fiber with respect to the optical detector at a position that corresponds to a relative peak signal output of the optical detector;

manipulating the optical fiber and monitoring the output signal of the optical detector to confirm that the output signal of the optical detector is stable during manipulation; and fixing the second end of the optical fiber to the optical detector;

wherein the position of the optical detector is adjusted angularly about at least one of two rotational axes.

16. A fiber optic assembly including an optical fiber and an optical detector, the fiber optic subassembly being made according to the method comprising:

coupling a light source to a first end of the optical fiber enabling light energy to be transmitted from the first end through the optical fiber to a second end of the optical fiber;

positioning the second end of the optical fiber relative to the optical detector;

measuring an output signal output by the optical detector;

adjusting the position of the second end of the optical fiber relative to the optical detector to align the second end of the optical fiber with respect to the optical detector at a position that corresponds to a relative peak signal output of the optical detector;

manipulating the optical fiber and monitoring the output signal of the optical detector to confirm that the output signal of the optical detector is stable during manipulation; and fixing the second end of the optical fiber to the optical detector;

wherein the position of the optical detector is adjusted angularly about at least one of two rotational axes.

* * * * *